United States Patent
Park et al.

(10) Patent No.: US 9,864,224 B2
(45) Date of Patent: Jan. 9, 2018

(54) LIQUID CRYSTAL DISPLAY

(71) Applicant: Samsung Display Co., Ltd., Yongin, Gyeonggi-Do (KR)

(72) Inventors: Do Yeong Park, Seoul (KR); Je Hyeong Park, Seoul (KR); Kyung-Bae Kim, Seoul (KR); Jun Seok Lee, Seoul (KR); Chang Il Tae, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/821,531

(22) Filed: Aug. 7, 2015

(65) Prior Publication Data

US 2016/0216550 A1     Jul. 28, 2016

(30) Foreign Application Priority Data

Jan. 26, 2015   (KR) .................. 10-2015-0012143

(51) Int. Cl.
*G02F 1/1335*     (2006.01)
*G02F 1/1333*     (2006.01)

(52) U.S. Cl.
CPC .............. *G02F 1/133512* (2013.01); *G02F 2001/133388* (2013.01)

(58) Field of Classification Search
CPC ...... G02F 1/13; G02F 1/1339; G02F 1/13392; G02F 1/13394; G02F 2001/13396; G02F 2001/13398

See application file for complete search history.

(56) References Cited

U.S. PATENT DOCUMENTS

| | | | | |
|---|---|---|---|---|
| 5,946,070 A | * | 8/1999 | Kohama | G02F 1/1339 349/156 |
| 7,714,959 B2 | * | 5/2010 | Maeda | G02F 1/133512 349/110 |
| 2003/0107698 A1 | * | 6/2003 | Nagayama | G02F 1/1339 349/149 |
| 2010/0231840 A1 | * | 9/2010 | Saida | G02F 1/1333 349/153 |
| 2011/0181816 A1 | | 7/2011 | Kang et al. | |

(Continued)

FOREIGN PATENT DOCUMENTS

| KR | 1020040107937 A | 12/2004 |
|---|---|---|
| KR | 1020090052590 A | 5/2009 |
| KR | 1020110038477 A | 4/2011 |

(Continued)

*Primary Examiner* — Michael Caley
*Assistant Examiner* — Mariam Qureshi
(74) *Attorney, Agent, or Firm* — Innovation Counsel LLP

(57) ABSTRACT

A liquid crystal display includes: a first substrate; a plurality of pixels disposed on the first substrate; a dummy pixel disposed on the first substrate and disposed at an outer side of the plurality of pixels; a pixel pattern disposed on the first substrate and disposed at an outer side of the dummy pixel; a first light blocking member disposed on the dummy pixel and the pixel pattern; a second light blocking member adjacent to the first light blocking member and having a part disposed on the pixel pattern at a predetermined first thickness; a second substrate facing the first substrate; a common electrode disposed on the second substrate and configured to be applied with a common voltage; and a liquid crystal layer disposed between the first substrate and the second substrate.

8 Claims, 8 Drawing Sheets

(56) References Cited

U.S. PATENT DOCUMENTS

2015/0103284 A1* 4/2015 Nagasawa ......... G02F 1/134336
  349/46
2016/0018575 A1* 1/2016 Chen ................. G02F 1/133514
  359/887

FOREIGN PATENT DOCUMENTS

| KR | 1020110056961 A | 5/2011 |
| KR | 1020110076369 A | 7/2011 |
| KR | 1020130137457 A | 12/2013 |

* cited by examiner

LIQUID CRYSTAL DISPLAY

CROSS-REFERENCE TO RELATED APPLICATION

This application claims priority to and the benefit of Korean Patent Application No. 10-2015-0012143 filed in the Korean Intellectual Property Office on Jan. 26, 2015, the entire contents of which are incorporated herein by reference.

BACKGROUND (a) Field

The present application relates to a liquid crystal display capable of preventing light leakage.

(b) Description of the Related Art

A flat panel display refers to a display device having a thin thickness as compared to a size of a screen, and examples of the flat panel display which is widely used include a liquid crystal display, an organic light emitting display, an electrophoretic display, an electrowetting display, and the like.

As an example of the display device, the liquid crystal display, which is one of the flat panel displays which are currently and widely used, includes two sheets of display panels on which electric field generating electrodes such as a pixel electrode, a common electrode, and the like and an alignment film are formed, a liquid crystal layer interposed between the two sheets of display panels, and a plurality of color filters for displaying color. The alignment film determines initial alignment of liquid crystal molecules and the electric field generating electrode generates an electric field so as to change the alignment of the liquid crystal molecules of the liquid crystal layer. In the liquid crystal display described above, incident light that passes through the liquid crystal layer has a polarization state which is changed depending on the alignment of the liquid crystal molecules and the change in polarization may appear as a change in transmittance of light by a polarizer.

The liquid crystal display includes a vertically aligned (VA) mode in which long axes of the liquid crystal molecules are arranged so as to be perpendicular to the display panel in a state in which the electric field is not applied to the liquid crystal display. In the liquid crystal display of the vertically aligned mode, the electric field is generated in the liquid crystal layer by forming the pixel electrode in a lower panel and forming the common electrode in an upper panel and a tilted degree of the liquid crystal molecules may be determined depending on intensity of the electric field.

Meanwhile, the liquid crystal display may include a light blocking member in order to prevent light from being leaked or reflected between the pixel electrodes and increase a contrast ratio. Typically, since the light blocking member is formed in a matrix shape across the entire surface of the panel, it is also referred to as a black matrix and is formed of a light shielding material.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display having features capable of preventing a light leakage phenomenon occurring at an outer side thereof.

An exemplary embodiment provides a liquid crystal display including: a first substrate; a plurality of pixels disposed on the first substrate; a dummy pixel disposed on the first substrate and disposed at an outer side of the plurality of pixels; a pixel pattern disposed on the first substrate and disposed at an outer side of the dummy pixel; a first light blocking member disposed on the dummy pixel and the pixel pattern; a second light blocking member adjacent to the first light blocking member and having a part disposed on the pixel pattern at a predetermined first thickness; a second substrate facing the first substrate; a common electrode disposed on the second substrate and configured to be applied with a common voltage; and a liquid crystal layer disposed between the first substrate and the second substrate.

In the liquid crystal display, the rest of the second light blocking member except for the part of the second light blocking member may be disposed at an outer side of the pixel pattern.

In the liquid crystal display, a boundary between the first light blocking member and the second light blocking member may be disposed on the pixel pattern.

In the liquid crystal display, the first light blocking member may be formed by a half tone mask and the second light blocking member may be formed by a full tone mask.

In the liquid crystal display, a portion corresponding to the part of the second light blocking member is removed from the common electrode.

In the liquid crystal display, a portion corresponding to the part of the second light blocking member may be removed from the second substrate, and a portion corresponding to the part of the second light blocking member may be removed from the common electrode.

The liquid crystal display may further include a dam having the second light blocking member disposed thereon, and a portion corresponding to the second light blocking member disposed on the dam may be removed from the common electrode.

In the liquid crystal display, a portion corresponding to the second light blocking member disposed on the dam may be removed from the second substrate.

According to an embodiment, the light leakage phenomenon occurring at the outer side of the liquid crystal display may be efficiently prevented by the light blocking member capable of simultaneously serving as the black matrix and the column spacer.

DETAILED DESCRIPTION OF THE EMBODIMENTS

Figure 1:
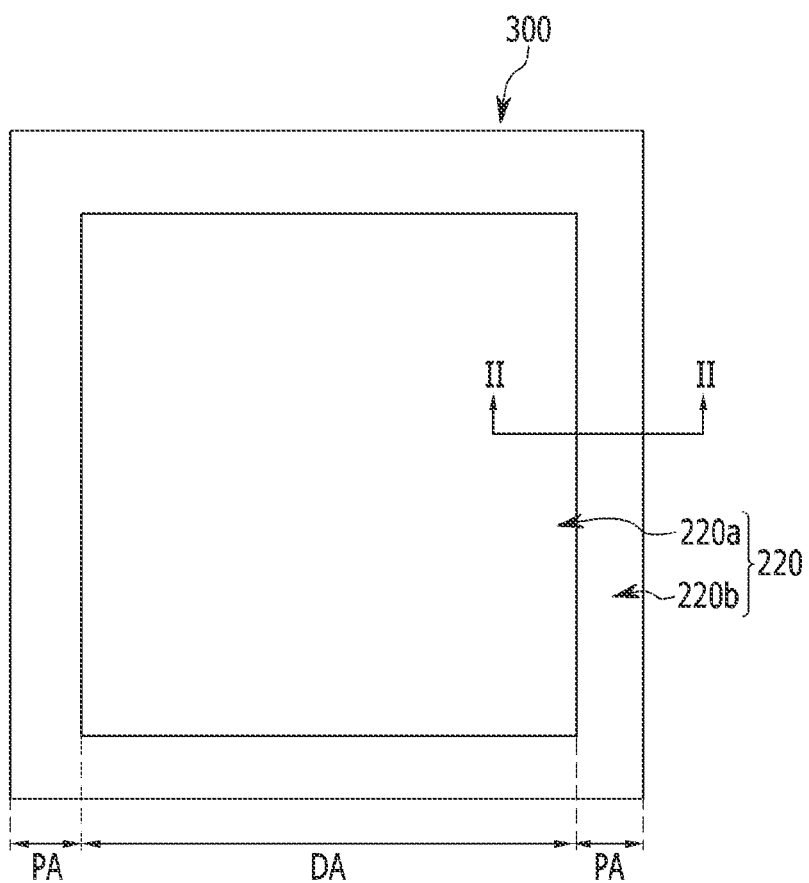
FIG. 1 is a layout view of a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment will be described with reference to FIGS. 1 and 2.

Figure 2:
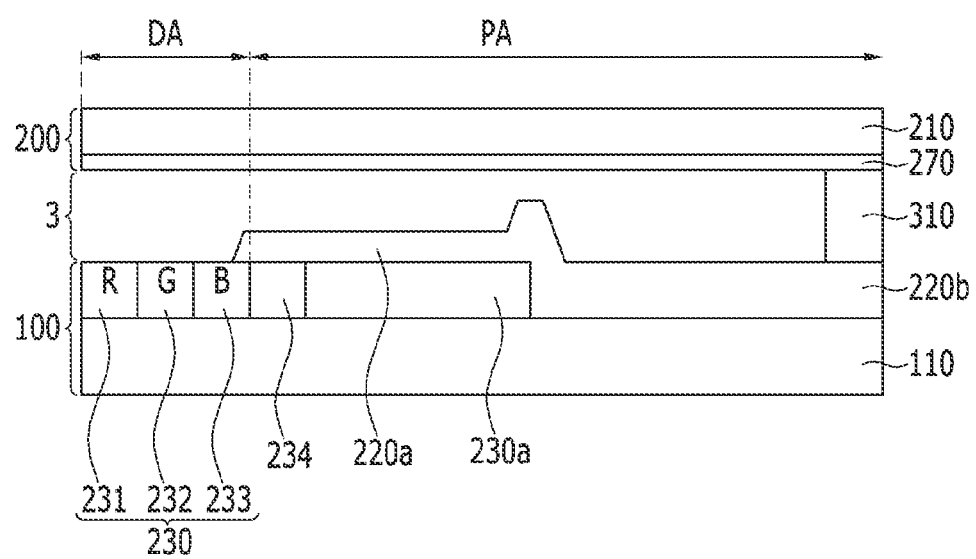
FIG. 2 is a cross-sectional view taken along line II-II of the liquid crystal display shown in FIG. 1.

FIG. 1 is a layout view of a liquid crystal display according to an exemplary embodiment and FIG. 2 is a cross-sectional view taken along line II-II of the liquid crystal display shown in FIG. 1.

Referring to FIGS. 1 and 2, a display panel 300 of the liquid crystal display according to an exemplary embodiment includes a display area DA, which is an area on which an image is display when being viewed in a plane structure, and a peripheral area PA disposed around the display area DA. The display panel 300 according to an exemplary embodiment includes a lower display panel 100 and an upper display panel 200 that face each other, and a liquid crystal layer 3 disposed between the lower display panel 100 and the upper display panel 200. The lower display panel 100 and an upper display panel 200 include a lower substrate 110 and an upper substrate 210, respectively.

Referring to FIGS. 1 and 2, the display area DA includes a plurality of signal lines and a plurality of pixels connected to the plurality of signal lines and arranged in approximately a matrix shape.

The signal lines include a plurality of gate lines that are included in the lower display panel 100 and transfer a gate signal (also referred to as a "scanning signal") and a plurality of data lines that transfer a data voltage. The gate lines are extended in approximately a horizontal direction and are almost parallel to each other, and the data lines are extended in approximately a vertical direction and are almost parallel to each other. In the drawings, the horizontal direction is shown as an x direction and the vertical direction is shown as a y direction which is perpendicular to the x direction.

Each pixel may include a switching element (not shown) connected to at least one gate line and at least one data line, and at least one pixel electrode connected to the switching element. The switching element may include at least one thin film transistor. A common electrode 270 may transfer a common voltage, and in an exemplary embodiment, the common electrode 270 is disposed on the upper display panel 200, but is not limited thereto. For example, the common electrode 270 may also be disposed on the lower display panel 100.

In order to implement a color display, each pixel uniquely displays one of primary colors (space division) or alternately displays the primary colors over time (time division), thereby allowing a desired color to be recognized by the spatial and temporal sum of these primary colors. Examples of the primary colors may include three primary colors such as red R, green G, and blue B, three primary colors such as yellow, cyan, and magenta, or four primary colors. Each pixel may be disposed in a position corresponding to each pixel electrode and may further include a color filter 230 displaying one of the primary colors. According to an exemplary embodiment, in the lower display panel 100, each pixel may include any one color filter 230 of a red color filter 231, a green color filter 232, and a blue color filter 233. The elements 230, 231, 232, 233 may also generally refer to pixels, e.g., a red pixel 231, a green pixel 232, and a blue pixel 233.

In the cross-sectional view of the liquid crystal display according to an exemplary embodiment shown in FIG. 2, a dummy pixel 234 is disposed at an outer side of the display area DA, that is, a boundary between the display area DA and the peripheral area PA.

In the peripheral area PA, a pixel pattern 230a for preventing a decrease in optical density is disposed on a side surface of the dummy pixel 234. In this case, a pattern of the outermost pixel 233 of the display area DA which is in contact with the dummy pixel 234 may be inserted into the pixel pattern 230a of the peripheral area PA. According to an exemplary embodiment, since the outermost pixel of the display area DA is a blue pixel 233, the pixel pattern 230a of the blue pixel is disposed beside the dummy pixel 234 of the peripheral area PA.

A light blocking member 220 is disposed on an upper portions and outer sides of the dummy pixel 234 and the pixel pattern 230a. In addition, a seal 310 may be disposed at the outermost side of the peripheral area PA. The seal 310 is formed at circumferences of the lower display panel 100 and the upper display panel 200 and forms a closed loop. Referring to FIG. 2, the seal 310 couples the lower display panel 100 and the upper display panel 200 to each other so as to be fixed and confines the liquid crystal layer 3 between the display panels 100 and 200. The seal 310 may be transparent and may also be opaque. The seal 310 when opaque may include pigment such as black carbon.

According to an exemplary embodiment, a first light blocking member 220a is disposed on the dummy pixel 234 and the pixel pattern 230a and a second light blocking member 220b connected to the first light blocking member 220a is disposed on a side surface of the pixel pattern 230a. According to an exemplary embodiment, the first light blocking member 220a and the second light blocking member 220b may be one part of the light blocking member 220 capable of simultaneously serving as a black matrix and a column spacer. According to an exemplary embodiment, the light blocking member 220 capable of simultaneously serving as the black matrix and the column spacer may be formed by a multi tone mask, the first light blocking member 220a may be formed by a half tone mask, and the second light blocking member 220b may be formed by a full tone mask. According to an exemplary embodiment, the first light blocking member 220a and the second light blocking member 220b that are included in the peripheral area PA may occupy 16% or more of the peripheral area PA. For example, in the case in which the peripheral area PA has a width of 5 mm, the first light blocking member 220a and the second light blocking member 220b may be formed in an outer side direction of the display area DA so as to have a width of 0.8 mm or more.

In addition, one part of the second light blocking member 220b is formed on the pixel pattern 230a at a predetermined first thickness. Therefore, a boundary between the first light blocking member 220a and the second light blocking member 220b is disposed on the pixel pattern 230a, and one part of the second light blocking member 220b formed at the boundary part between the first light blocking member 220a and the second light blocking member 220b is also disposed on the pixel pattern 230a. One part of the second light blocking member 220b formed on the pixel pattern 230a may prevent light leakage which may occur at the outer side of the pixel pattern 230a even in the case in which an overlay of the first light blocking member 220a and the second light blocking member 220b is misaligned. In this case, a height of the second light blocking member 220b formed on the pixel pattern 230a is similar to the highest portion of the light blocking member 220, that is, a height of a main column spacer. In this case, the main column spacer may be formed together with the seal 310.

Next, a liquid crystal display according to another exemplary embodiment will be described with reference to FIGS. 3 to 8. The same components as those of the exemplary embodiment described above will be denoted by the same reference numerals, a description thereof will be omitted, and a difference therebetween will be described, which are equally applied below.

Figure 3:
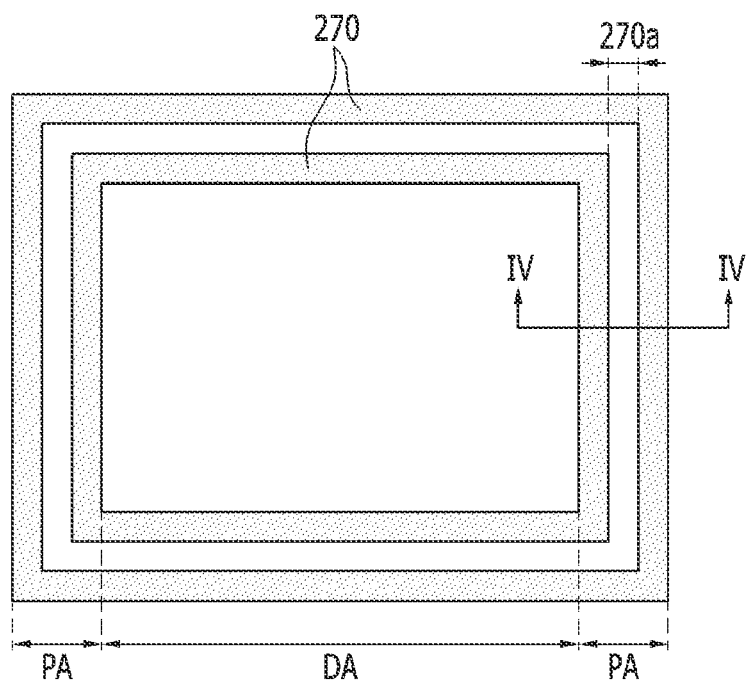
FIG. 3 is a layout view of a liquid crystal display according to another exemplary embodiment.
Figure 4:
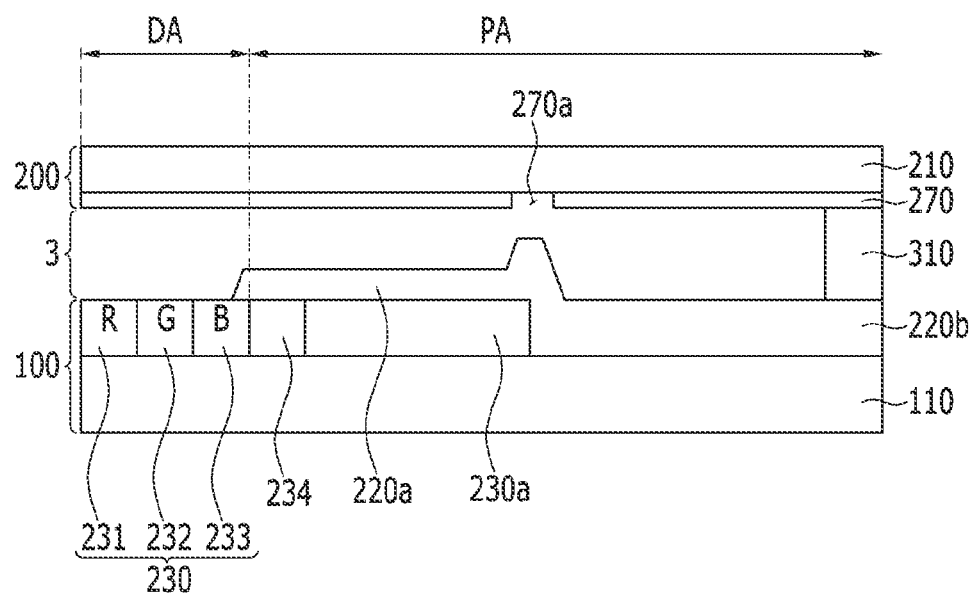
FIG. 4 is a cross-sectional view taken along line IV-IV of the liquid crystal display shown in FIG. 3.
Figure 5:
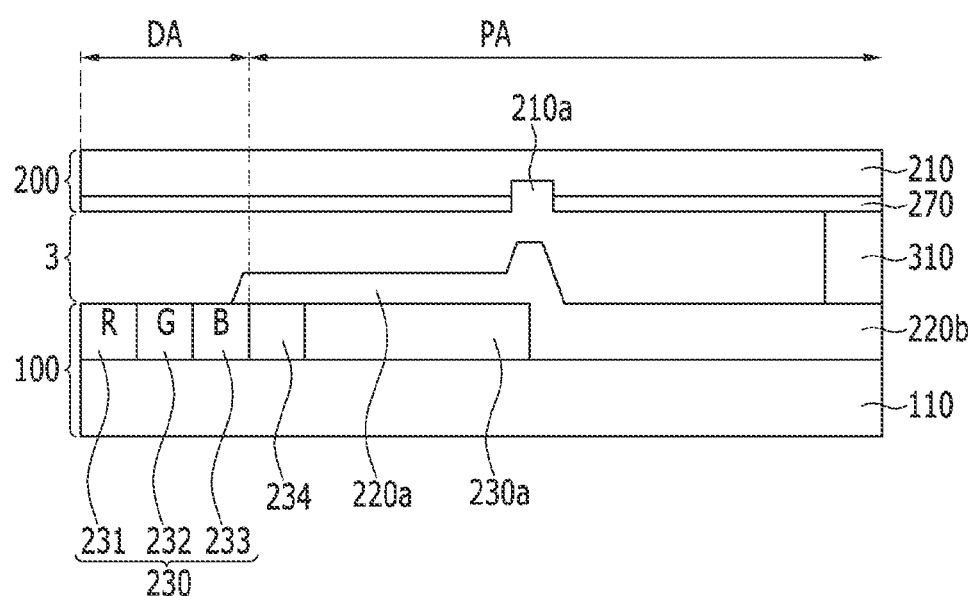
FIG. 5 is another cross-sectional view taken along line IV-IV of the liquid crystal display shown in FIG. 3.
Figure 6:
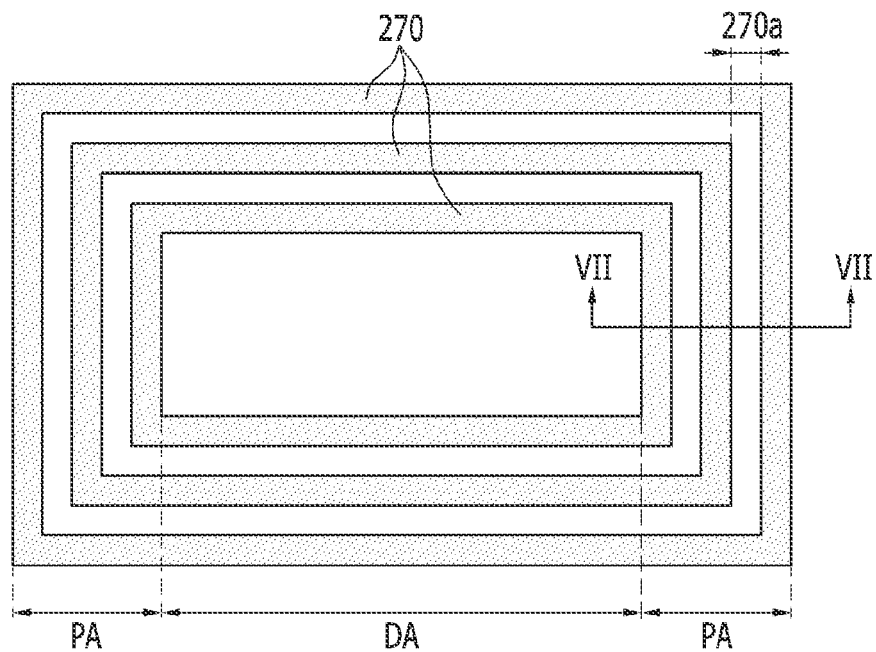
FIG. 6 is a layout view of a liquid crystal display according to another exemplary embodiment.
Figure 7:
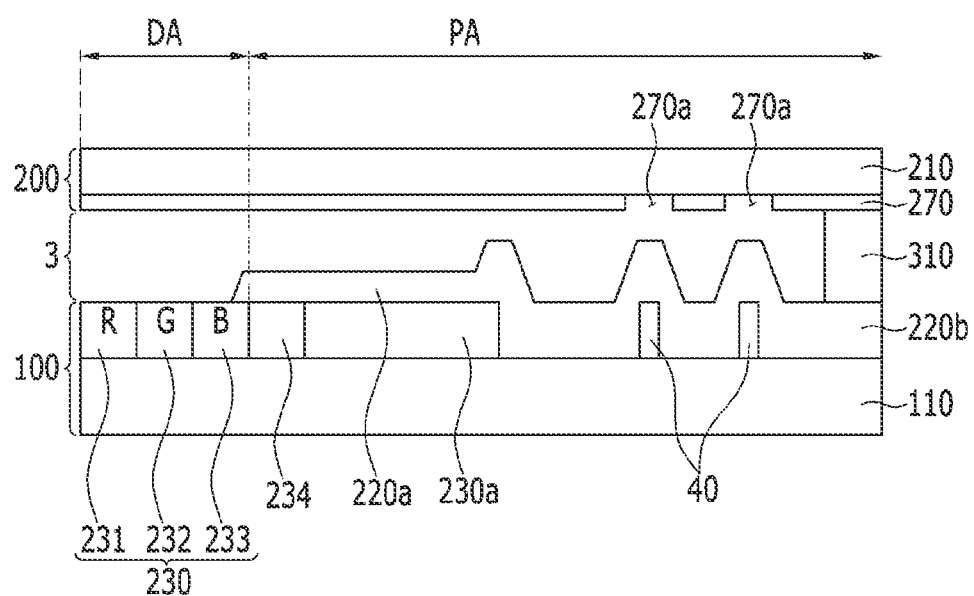
FIG. 7 is a cross-sectional view taken along line VII-VII of the liquid crystal display shown in FIG. 6.
Figure 8:
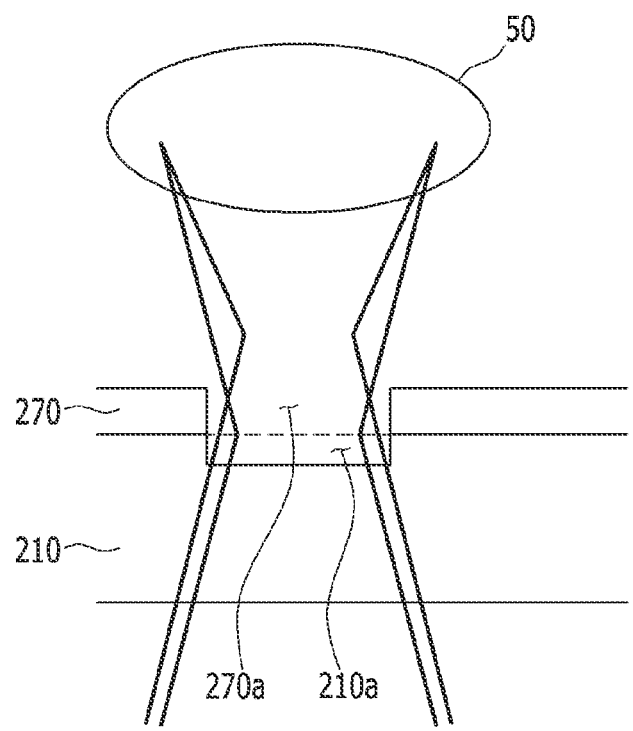
FIG. 8 is a concept view showing a method of removing one part of an upper display panel in the liquid crystal display according to another exemplary embodiment.

FIG. 3 is a layout view of a liquid crystal display according to another exemplary embodiment. FIG. 4 is a cross-sectional view taken along line IV-IV of the liquid crystal display shown in FIG. 3. FIG. 5 is another cross-sectional view taken along line IV-IV of the liquid crystal display shown in FIG. 3. FIG. 6 is a layout view of a liquid crystal display according to another exemplary embodiment. FIG. 7 is a cross-sectional view taken along line VII-VII of the liquid crystal display shown in FIG. 6. FIG. 8 is a concept view showing a method of removing one part of an upper display panel in the liquid crystal display according to another exemplary embodiment.

As shown in an exemplary embodiment, e.g., referring to FIGS. 4 and 5, in the case in which one part of the second light blocking member 220b is formed on the pixel pattern 230a, a step may be formed at a boundary between the first light blocking member 220a and the second light blocking member 220b as much as a height difference between the first light blocking member 220a and the second light blocking member 220b. That is, the step is formed at the transition between the first light blocking member 220a and the second light blocking member 220b due to the greater thickness of the second light blocking member 220b. FIG. 3 shows the liquid crystal display in which one part 270a of the peripheral area PA is removed, in order to solve a side effect of the step formed as much as the height difference between the first light blocking member 220a and the second light blocking member 220b. Part 270a is also called an opening 270a in the peripheral area PA.

Referring to FIG. 4, in the liquid crystal display according to one exemplary embodiment, the step due to the height difference between the first light blocking member 220a and the second light blocking member 220b is formed at the boundary between the first light blocking member 220a and the second light blocking member 220b. In addition, in order to prevent a light leakage spot phenomenon due to the step or the disturbing of diffusion of liquid crystal molecules by the step, the common electrode 270 disposed on the step is removed to form the opening 270a. Referring to FIG. 5, in the liquid crystal display according to another exemplary embodiment, one part of the upper substrate 210 and the common electrode 270 on the step occurring due to the height difference between the first light blocking member 220a and the second light blocking member 220b are removed to form the opening 210a extending through the common electrode 270 and partially into the substrate 210.

If there is no opening 270a or 210a, the gap between the step and the common electrode 270 is too small to diffuse liquid crystal molecules into the space between the step and seal 310, which creates an "unfilled area" problem.

FIG. 6 shows another liquid crystal display in which one part of the peripheral area PA is removed to form openings 270a, in order to solve a side effect of the step formed as much as the height difference between the first light blocking member 220a and the second light blocking member 220b.

Referring to FIGS. 6 and 7, since the liquid crystal display according to another exemplary embodiment has a dam 40 formed in the peripheral area PA and in the second light blocking member 220b, e.g., with the second light blocking member 220b thereon, the second light blocking member 220b disposed on a portion on which the dam 40 is formed is formed to be higher than other portions of the second light blocking member 220b due to the dam 40. The dam 40 is formed to control the flow of liquid crystal aligning agent. The liquid crystal aligning agent is used to form a liquid crystal aligning film. If there is no dam 40, the liquid crystal aligning agent will flow into a seal line area in which the seal 310 will be formed, which lowers the adhesive strength of the seal 310. Furthermore, the dam 40 prevents the backflow of the liquid crystal aligning agent, which makes the liquid crystal aligning film undesirable.

Similar to the step of the second light blocking member 220b formed on the pixel pattern 230a, the step of the second light blocking member 220b formed on the dam 40 may also disturb the diffusion of the liquid crystal molecules at the time of a liquid crystal injection process. Therefore, referring to FIG. 7, the common electrode 270 corresponding to an upper part of the step disposed on the dam 40 formed in the second light blocking member 220b is removed to form two openings 270a.

In one embodiment, one part of the upper substrate 210 and the common electrode 270 that are present on the step may be removed by a laser beam radiating apparatus.

FIG. 8 is a concept view showing a method of removing one part of an upper display panel in the liquid crystal display according to another exemplary embodiment by the laser beam radiating apparatus.

Referring to FIG. 8, the laser beam radiating apparatus may change a laser condition by adjusting power, a pulse frequency, a wavelength, a focus distance, a laser beam size, or the like. The laser beam radiating apparatus may include a lens 50, adjust a focus position of the lens 50, and adjust intensity or size of laser beam radiated to the upper substrate 210 or the common electrode 270 to be removed. For example, the laser beam radiating apparatus may remove the common electrode 270 on the step as in another exemplary embodiment shown in FIG. 4, by adjusting the lens 50 to be focused to only the common electrode 270. Alternatively, the laser beam radiating apparatus may remove one part of the upper substrate 210 and the common electrode 270 on the step as in another exemplary embodiment shown in FIG. 5, by adjusting the lens 50 to be focused in order of the common electrode 270 and the upper substrate 210.

As described above, the liquid crystal display according to an embodiment may efficiently prevent the light leakage phenomenon occurring at the outer side of the panel by the light blocking member capable of simultaneously serving as the black matrix and the column spacer.

While the inventive concept has been described in connection with what is presently considered to be practical exemplary embodiments, it is to be understood that the inventive concept is not limited to the disclosed embodiments, but, on the contrary, is intended to cover various

| <Description of symbols> | |
|---|---|
| 3: liquid crystal layer | |
| 100, 200: display panel | 110, 210: substrate |
| 220: light blocking member | 220a: first light blocking member |
| 220b: second light blocking member | 230: color filter |
| 234: dummy pixel | 230a: pixel pattern |
| 310: seal | |

What is claimed is:

1. A liquid crystal display comprising:
a first substrate;
a plurality of pixels disposed on a display area of the first substrate;
a dummy pixel disposed on a peripheral area of the first substrate and disposed at an outer side of the plurality of pixels;
a pixel pattern disposed on the peripheral area of the first substrate and disposed at an outer side of the dummy pixel;
a first light blocking member disposed on the dummy pixel and the pixel pattern;
a second light blocking member connected to the first light blocking member and having a part disposed on the pixel pattern;
a second substrate facing the first substrate;
a common electrode disposed on the second substrate and configured to be applied with a common voltage; and
a liquid crystal layer disposed between the first substrate and the second substrate,
wherein the display area is configured to display an image and the peripheral area is disposed around the display area,
wherein a thickness of the first light blocking member is different than a thickness of the second light blocking member, and
wherein the second light blocking member is configured to have a part disposed at an outer side surface of the pixel pattern.

2. The liquid crystal display of claim 1, wherein:
the rest of the second light blocking member except for the part of the second light blocking member are disposed at an outer side of the pixel pattern.

3. The liquid crystal display of claim 1, wherein:
a boundary between the first light blocking member and the second light blocking member is disposed on the pixel pattern.

4. The liquid crystal display of claim 1, wherein:
the first light blocking member is formed by a half tone mask and the second light blocking member is formed by a full tone mask.

5. The liquid crystal display of claim 1, wherein:
a portion corresponding to the part of the second light blocking member is removed from the common electrode.

6. The liquid crystal display of claim 1, wherein:
a portion corresponding to the part of the second light blocking member is removed from the second substrate, and
a portion corresponding to the part of the second light blocking member is removed from the common electrode.

7. The liquid crystal display of claim 1, further comprising:
a dam having the second light blocking member disposed thereon, and
a portion corresponding to the second light blocking member disposed on the dam is removed from the common electrode.

8. The liquid crystal display of claim 7, wherein:
a portion corresponding to the second light blocking member disposed on the dam is removed from the second substrate.

* * * * *